US008185583B2

(12) United States Patent
Tiruthani et al.

(10) Patent No.: US 8,185,583 B2
(45) Date of Patent: May 22, 2012

(54) VISUALIZATION ENHANCED PRESENCE SYSTEM

(75) Inventors: Saravanakumar V. Tiruthani, Santa Clara, CA (US); Marcelo Oliveira, San Jose, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 1136 days.

(21) Appl. No.: 11/144,426

(22) Filed: Jun. 3, 2005

(65) Prior Publication Data

US 2006/0277256 A1    Dec. 7, 2006

(51) Int. Cl.
*G06F 15/16* (2006.01)

(52) U.S. Cl. .................................... 709/204; 348/14.01

(58) Field of Classification Search .................. 709/206; 379/93.01–93.37; 348/14.01–14.016
See application file for complete search history.

(56) References Cited

U.S. PATENT DOCUMENTS

| | | | | |
|---|---|---|---|---|
| 5,892,856 A * | 4/1999 | Cooper et al. | ................ | 382/291 |
| 5,914,747 A * | 6/1999 | Hamilton | ................ | 348/14.08 |
| 6,583,813 B1 * | 6/2003 | Enright et al. | ................ | 348/150 |
| 6,693,662 B1 * | 2/2004 | Parker et al. | ................ | 348/14.01 |
| 7,003,795 B2 * | 2/2006 | Allen | ................ | 725/105 |
| 7,187,402 B2 * | 3/2007 | Yonezawa et al. | ................ | 348/159 |
| 7,242,421 B2 * | 7/2007 | Center et al. | ................ | 348/14.1 |
| 7,299,286 B2 * | 11/2007 | Ramsayer et al. | ................ | 709/228 |
| 7,499,528 B2 * | 3/2009 | Lee et al. | ................ | 379/88.19 |
| 7,595,816 B1 * | 9/2009 | Enright et al. | ................ | 348/150 |
| 7,852,783 B2 * | 12/2010 | Tasker et al. | ................ | 370/252 |
| 7,920,847 B2 * | 4/2011 | Jennings et al. | ................ | 455/411 |
| 2001/0051984 A1 * | 12/2001 | Fukasawa | ................ | 709/205 |
| 2002/0118809 A1 | 8/2002 | Eisenberg | | |
| 2002/0163572 A1 * | 11/2002 | Center et al. | ................ | 348/14.08 |
| 2002/0196746 A1 * | 12/2002 | Allen | ................ | 370/260 |
| 2003/0187940 A1 * | 10/2003 | Ludwig et al. | ................ | 709/206 |
| 2004/0098491 A1 * | 5/2004 | Costa-Requena et al. | ..... | 709/229 |
| 2004/0240434 A1 * | 12/2004 | Sato et al. | ................ | 370/352 |
| 2004/0267885 A1 * | 12/2004 | Zimmermann et al. | ....... | 709/206 |
| 2005/0086311 A1 * | 4/2005 | Enete et al. | ................ | 709/206 |
| 2005/0195950 A1 * | 9/2005 | Lee et al. | ................ | 379/88.19 |

(Continued)

FOREIGN PATENT DOCUMENTS

WO          03/081892 A2     10/2003

OTHER PUBLICATIONS

J. Rosenberg; SIP: Session Initiation Protocol; Jun. 2002; http://www.ietf.org/rfc/rfc3261.txt.*

(Continued)

*Primary Examiner* — Abdullahi Salad
*Assistant Examiner* — Jimmy H Tran
(74) *Attorney, Agent, or Firm* — Buchanan Ingersoll & Rooney PC

(57) ABSTRACT

An originating endpoint supports visual presence indications. The originating endpoint determines a destination endpoint with which to establish a desired communication session. A network communicates a notification message to the destination endpoint regarding the desired communication session. Prior to establishing the desired communication session and in response to the notification message, the originating endpoint receives image capture data representing the surroundings of the destination endpoint. The originating endpoint may then determine from the image capture data whether to continue or terminate the attempt to establish the communication session. Visual presence indications may increase productivity by reducing the time that would otherwise be spent on unsuccessful call attempts. Visual presence indications may also conserve network bandwidth and processing resources that would otherwise be spent on the unsuccessful call attempts.

19 Claims, 5 Drawing Sheets

U.S. PATENT DOCUMENTS

| | | | |
|---|---|---|---|
| 2005/0223097 A1* | 10/2005 | Ramsayer et al. | 709/227 |
| 2006/0031291 A1* | 2/2006 | Beckemeyer | 709/204 |
| 2006/0103762 A1* | 5/2006 | Ly et al. | 348/584 |
| 2006/0105794 A1* | 5/2006 | Carlson et al. | 455/518 |
| 2006/0123086 A1* | 6/2006 | Morris | 709/206 |
| 2007/0005804 A1* | 1/2007 | Rideout | 709/246 |
| 2007/0186002 A1* | 8/2007 | Campbell et al. | 709/231 |
| 2007/0229652 A1* | 10/2007 | Center et al. | 348/14.08 |
| 2008/0098068 A1* | 4/2008 | Ebata | 709/206 |
| 2009/0203365 A1* | 8/2009 | Lee et al. | 455/414.1 |

OTHER PUBLICATIONS

J. Rosenberg et al., SIP: Session Initiation Protocol, Jun. 2002, p. 1-17, http://tools.ietf.org/html/rfc3261.*

H. Sugano et al., Presence Information Data Format (PDIF), IETF Instant Messaging and Presence Protocol (IMPP) Working Group, May 2003.

J. Peterson, Common Profile for Presence (CPP), IETF Instant Messaging and Presence Protocol (IMPP) Working Group, Aug. 14, 2003.

P. Saint-Andre, Ed., Extensible Messaging and Presence Protocol (XMPP): Core, Jabber Software Foundation, May 6, 2004.

P. Saint-Andre, Mapping the Extensible Messaging and Presence Protocol (XMPP) to Common Presence and Instant Messaging (CPIM), Jabber Software Foundation, May 3, 2004.

P. Saint-Andre, Ed., Extensible Messaging and Presence Protocol (XMPP): Instant Messaging and Presence, Jabber Software Foundatin, Apr. 12, 2004.

M. Day et al., Instant Messaging / Presence Protocol Requirements (Request for Comments: 2779), IETF Instant Messaging and Presence Protocol (IMPP) Working Group, Feb. 2000.

M. Day et al., A model for Presence and Instant Messaging (Request for Comments: 2778), The Internet Society, Feb. 2000.

J. Rosenberg, et al., A Data Format for Presence Using XML, IETF Internet Draft, Jun. 15, 2000.

Rosenberg et al., SIP Extensions for Presence, Internet Engineering Task Force, Jul. 20, 2001.

Rishi L et al.: "Presence and its effect on network," Personal Wireless Communications, 2005. ICPWC 2005, 2005 IEEE International Conference on New Delhi, India Jan. 23-25, 2005, Piscataway, NJ, USA, IEEE, Jan. 23, 2005, pp. 368-372. ISBN: 0-7809-8964-6.

Gross T: "Towards ubiquitous awareness: the PRAVTA prototype," Parallel and Distributed Processing, 2001. Proceedings, Ninth Euromicro Workshop on Feb. 7-9, 2001, Piscataway, NJ, USA, IEEE, Feb. 7, 2001, pp. 139-146.

* cited by examiner

VISUALIZATION ENHANCED PRESENCE SYSTEM

FIELD OF THE INVENTION

This invention relates to messaging systems which communicate presence information. In particular, this invention relates to expanding presence system capabilities to include video or image presence information.

BACKGROUND OF THE INVENTION

Businesses are critically reliant on effective and efficient communication. The drive to improve communication, in conjunction with rapid advances in processing technology, have lead to sophisticated messaging systems which handle voice, text, facsimiles and other types of data. For example, instant messaging systems are available that support a text exchange between parties, along with basic presence indicators.

Presence indicators attempt to give a potential caller an indication of whether another individual is available to take a call, answer an instant message, or otherwise engage in a communication session. However, the presence indicators (e.g., 'Busy') are primarily manually set and adjusted, leading to inaccurate indications of presence. Thus, even though a caller may check presence prior to calling, the presence indicator is frequently incorrect. The caller then wastes time initiating a call and waiting for the callee to answer, only to be redirected to voice mail.

In limited cases, presence indicators are automatically set. As one example, an instant messaging program may watch for mouse, keyboard, or other user input. When no input is detected for a predetermined time period, the instant messaging program changes the presence state to 'Away' or another indicator of unavailability. However, whether an individual is present is not necessarily dependent on whether they are interacting with their computer. In other words, automatically set presence indicators are often no more accurate than manually set presence.

Each attempt to initiate a messaging session consumes valuable, limited, resources. Each time a caller places a call, for example, the supporting messaging system and network infrastructure consume a portion of those limited resources. Each call consumes processor time, network bandwidth, physical channel (e.g., TDMA time slot) capacity, and other resources. Nevertheless, in prior messaging systems, a caller would often attempt to establish a messaging session based on inaccurate or incomplete presence indicators.

A need has long existed for improved presence indication for messaging services.

SUMMARY

A messaging system supports visual presence indication. Before establishing a communication session, the destination endpoint provides an image, video, or other visualization to the originating endpoint of the potential communication session. The visualization shows the surroundings of the destination endpoint. The originating endpoint thereby obtains a supplemented or independent indication of presence status associated with the destination endpoint. In the context of a voice call, for example, the person calling need not waste time allowing the callee's phone to ring, only to be redirected to voicemail. Instead, the caller may immediately see that the callee is not available to answer his phone and may immediately end the call attempt and return to productivity.

A presence enabled communication system determines a destination endpoint with which to establish a desired communication session. The communication system may be the originating endpoint, or may be another system interacting with the originating and destination endpoints. The communication system sends a notification message to the destination endpoint regarding the desired communication session. Prior to establishing the desired communication session and in response to the notification message, the communication system receives image capture data.

The image capture data provides a visualization of the surroundings of the endpoint. The originating endpoint uses the image capture data to provide an image capture display that may be employed as a supplemental or independent presence indicator. The originating endpoint may also obtain a decision (e.g., from an operator of the originating endpoint) regarding whether to continue or terminate the attempt to establish the desired communication session.

The image capture data may be a digital picture of the environment surrounding the destination endpoint. Alternatively or additionally, the image capture data may be a video or video stream of the environment. The image capture data may visualize any environment in which an automated or non-automated endpoint may be located, including offices, conference rooms, parking garages, video, audio or other program providers, or other environments.

The present invention is defined by the following claims, and nothing in this section should be taken as a limitation on those claims. Further aspects and advantages of the invention are discussed below in conjunction with the preferred embodiments. Any one or more of the above described aspects or aspects described below may be used independently or in combination with other aspects herein.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of systems and methods consistent with the messaging systems may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the messaging and presence systems will be described, methods, systems, and articles of manufacture consistent with the messaging systems may include additional or different components. For example, a processor may be implemented as a microprocessor, microcontroller, application specific integrated circuit (ASIC), discrete logic, or a combination of other types of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. The programs discussed below may be parts of a single program, separate programs, or distributed across several memories and processors.

Figure 1:
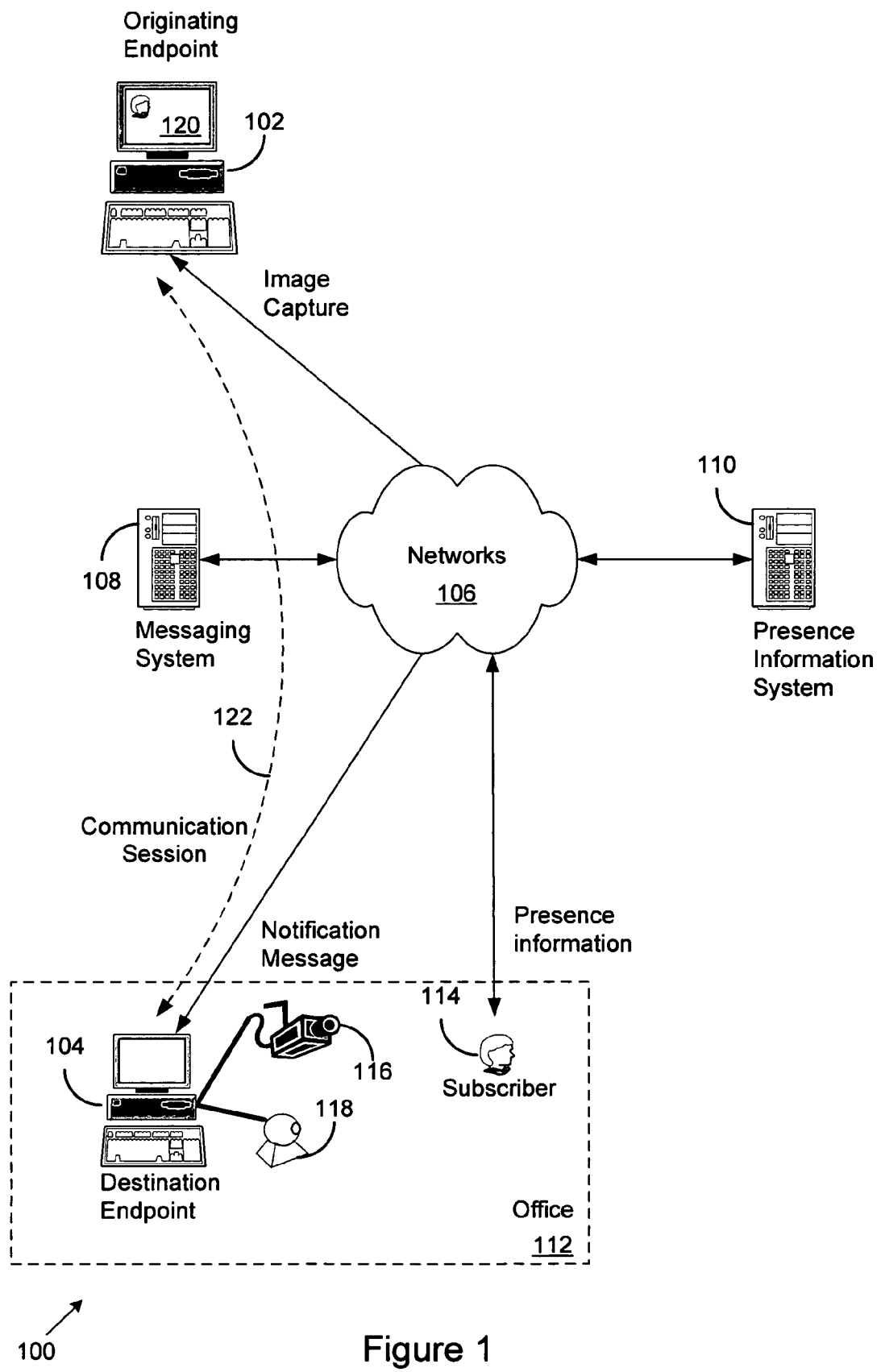
FIG. 1 illustrates a messaging network in which endpoints send and receive presence indicators in the form of image capture data.

FIG. 1 shows a messaging network 100 which establishes and manages communication sessions between endpoints. The messaging network 100 may also initiate communication sessions in certain situations. The communication sessions may include voice, text, image or other types of data. The communication sessions may be telephone calls, instant messaging sessions, fax messaging sessions, multi-media messaging sessions, text messaging exchanges, or other types of communication sessions.

The entities interacting in the network 100 include the originating endpoint 102 (e.g., a caller), the destination endpoint 104 (e.g., a callee), and the networks 106. The entities also include a messaging system 108 and a presence information system 110 which communicate through the networks 106. The messaging system 108 and presence information system 110 may be systems commercially available from Siemens Communications, Inc. Furthermore, the endpoints 102 and 104, messaging system 108, and/or presence information system 110 may incorporate or perform any of the processing described below with regard to any of the entities interacting in the network 100. For example, the originating endpoint 102 may implement the functions and/or features of both an endpoint and the messaging system 108.

In the example shown in FIG. 1, the destination endpoint 104 is a phone in an office 112 where an individual 114 works. The destination endpoint 104 may include or may exchange data with a video camera 116, a still picture camera 118, or any other image capture device. The image capture devices obtain and transmit image capture data. The image capture data may be used to render an image capture display 120 showing the destination endpoint surroundings. Thus, the image capture display 120 provides visual confirmation of whether the individual 114 is present.

The image capture devices may be positioned to provide a field of view of any location in whole or in part. Thus, the image capture devices may cover the entire office 112, a part of the office around the endpoint 104 (e.g., an office desk and chair), or any other portion of the office surroundings. The image capture devices thereby provide the image capture data for rendering a visualization of whether the individual 114 is present in the office 112 and/or available to interact with the destination endpoint 104.

The image capture devices may be added to any location where a visual representation of presence is desired. As examples, image capture devices may be added to conference rooms, lunch rooms, or other office locations; elevators, parking garages, hallways, stairwells, or other publicly accessible locations; and street signs, lampposts, intersections, or other traffic locations. The image capture devices may provide image capture data for interactive destination endpoints such as office phones, cell phones, and personal data assistants, or may provide image capture data for non-interactive destination endpoints such as automated response or information systems. Examples of non-interactive destination endpoints include cable television providers which may respond with image capture data showing movies that are currently playing or which are available for play, weather information providers which may responds with image capture data showing weather conditions, or any other automated response system.

The individual 114 subscribes to the presence information system 110 and/or messaging system 108. Accordingly, the destination endpoint 104 provides presence information for the individual 114 to the entities communicating over the networks 106 directly, or indirectly through the presence information system 110. The presence information includes image capture data provided by the video camera 116, picture camera 118, or other image capture devices.

The entities and networks 106 may exchange information using a packet based protocol. For example, the messaging system 108, presence information system 110, and endpoints 102 and 104 may employ the Real Time Protocol (RTP) over the User Datagram Protocol (UDP). Other protocols, including the Transmission Control Protocol/Internet Protocol (TCP/IP) or other network protocols may be additionally or alternatively employed. In addition, the signaling between the entities may proceed according to the H.323 packet-based multimedia communications system standard published by the International Telecommunications Union (ITU). The network or interconnection of networks 110 may include the Public Switched Telephone Network (PSTN) and may deliver data to cell phones, wireline phones, internet phones, or other communication devices.

The entities in the network 100 may employ protocols that adhere to any desired specification. For example, the entities may employ the Session Initiation Protocol (SIP) developed for Internet conferencing, telephony, presence, events notification and instant messaging, the Jabber protocol, or SIP for Instant Messaging and Presence Leveraging Extensions (SIMPLE). The form and content of the presence information may be established according to protocols consistent with the Internet Engineering Task Force (IETF) Request for Comments (RFC) 2778 or IETF RFC 2779. Alternatively, the entities may employ extensions to RFC 2778 or RFC 2779, or may employ proprietary protocols.

The endpoints 102 and 104 may be communication devices, automated response systems, or other types of devices. The endpoints 102 and 104 may include audio reproduction capability employed to deliver voice messages to a subscriber. The endpoints 102 and 104 may alternatively or additionally be cellular phones, desk phones, pagers, Personal Data Assistants (PDAs), computers, specific programs executing on the computers, or other devices or programs.

The individual 114 may have one or more presence states with respect to one or more endpoints, including the destination endpoint 104. Examples of presence states include 'Available', when the individual 114 is in the office 112 and available to receive messages; 'Out of Office', when the individual 114 is not in the office and is not available to receive message; and 'On Vacation', when the individual 114 is out of the office on vacation.

As an addition to, or as an alterative to such presence states, the video camera 116 and picture camera 118 provide image capture data. The image capture data provides a visual representation of presence for the individual 114. The entities communicating in the network 110 may communicate the image capture data between the endpoints 102 and 104. In one implementation, the destination endpoint 104 communicates the image capture data directly to the originating endpoint 102. In other implementations, the image capture data may be stored and/or archived in the presence information system 110. The presence information system 110 may then provide the image capture data to the originating endpoint 102.

Accordingly, for example, rather than allow a callee's phone to repeatedly ring until a voicemail system answers, an operator at the originating endpoint 102 may observe that no one is present to answer the call. The operator may then instruct the originating endpoint 102 to hang up without wasting time as the callee's phone continues to ring. The early termination of the call attempt may also save network bandwidth and processing resources for handling what would otherwise be a continued, but fruitless, call attempt.

The originating endpoint 102 may provide a decision of whether to continue the call attempt. For example, when the image capture display 120 reveals that the individual 114 is absent, the originating endpoint 102 may provide a decision to terminate the call attempt. Otherwise, the call attempt may proceed, and the endpoints 102 and 104 may establish the communication session 122 with or without the assistance of the messaging system 108 and/or the presence information system 110.

Figure 2:
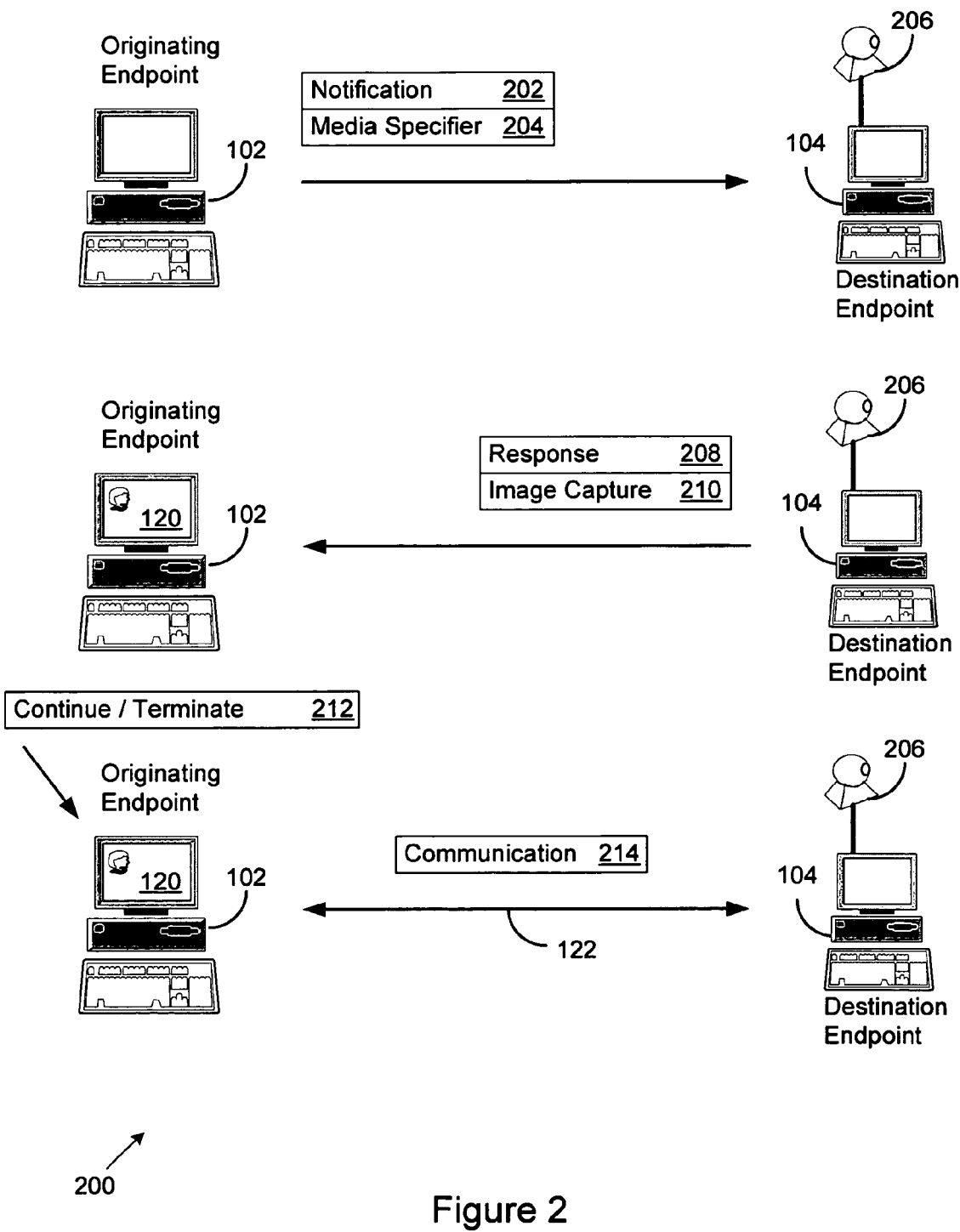
FIG. 2 illustrates data flow in a video enhanced messaging system.

FIG. 2 shows the flow of messages between the originating endpoint 102 and the destination endpoint 104. Although discussed below in the context of a voice call, the video enhanced systems may provide video presence for any type of communication session. The originating endpoint 102 (e.g., a telephone program on a personal computer) determines that the destination endpoint 104 (e.g., an office phone) is the desired endpoint for the voice call.

The originating endpoint 102 sends a notification message 202 to the destination endpoint 104. Alternatively, the originating endpoint 102 may inform the messaging system 108 that a communication session should be established between the endpoints 102 and 104. The messaging system 108 may then send the notification message 202 to the destination endpoint 104.

The notification message 202 may be accompanied by a media specifier 204 which is part of the notification message 202 or which may be a separate message. The media specifier 204 includes one or more data fields that inform the destination endpoint 104 of the media handling capabilities and/or media requests of the originating endpoint 102. Accordingly, the media specifier 204 may indicate that the originating endpoint 102 requests and/or can process images, video, video streams, or any combination of image data.

The destination endpoint 104 communicates directly or indirectly with the capture device 206. In response to the notification 202 and informed by the media specifier 204, the destination endpoint 104 may command the capture device 206 to capture an image, multiple images, a video, begin a streaming video, or provide any combination of video information. Also, in reply to the notification 202, the destination endpoint 104 or the messaging system 108 may provide a response 208.

The response 208 may provide a status of the initiation of the communication session to the originating endpoint 102. For example, the response 208 may indicate that the destination endpoint 104 is 'ringing', or is otherwise awaiting a response from an operator of the destination endpoint 104. In the same response 208, or in one or more additional messages, the destination endpoint may communicate the image capture data 210 to the originating endpoint 102. Alternatively or additionally, the destination endpoint 104 may provide the image capture data 210 to the presence information system 110.

The originating endpoint 102 receives the image capture data 210. An image processing program in the originating endpoint 102 interprets and renders the image capture data as an image capture display 120. The image processing program may be a program which displays .jpg, .gif, .bmp, .mpg, .avi, or .wmv files or any other type of image or video file.

With the visualization of presence, the operator interacting with the originating endpoint 102 may decide whether to continue the call attempt or terminate the call attempt. To that end, the operator provides a decision 212 to the originating endpoint 102. When the decision is to terminate the call attempt, the originating endpoint 102 and/or messaging system 108 may release the resources previously devoted to the attempt and thereby converse valuable and limited communication and processing resources.

Otherwise, the call attempt continues, and the callee may answer. The endpoints 102 and 104 establish the communication session 122. Communication data 214 flows between both endpoints 102 and 104. The communication data 214 may represent packetized voice data, or any other type of information.

In one implementation, the notification message 202 may be a SIP/INVITE/ message. The /INVITE/ message may be followed by the media specifier 204. Similarly, the response message 208 may be a SIP/RINGING/ message. Other notification and response messages may be employed, however.

Figure 3:
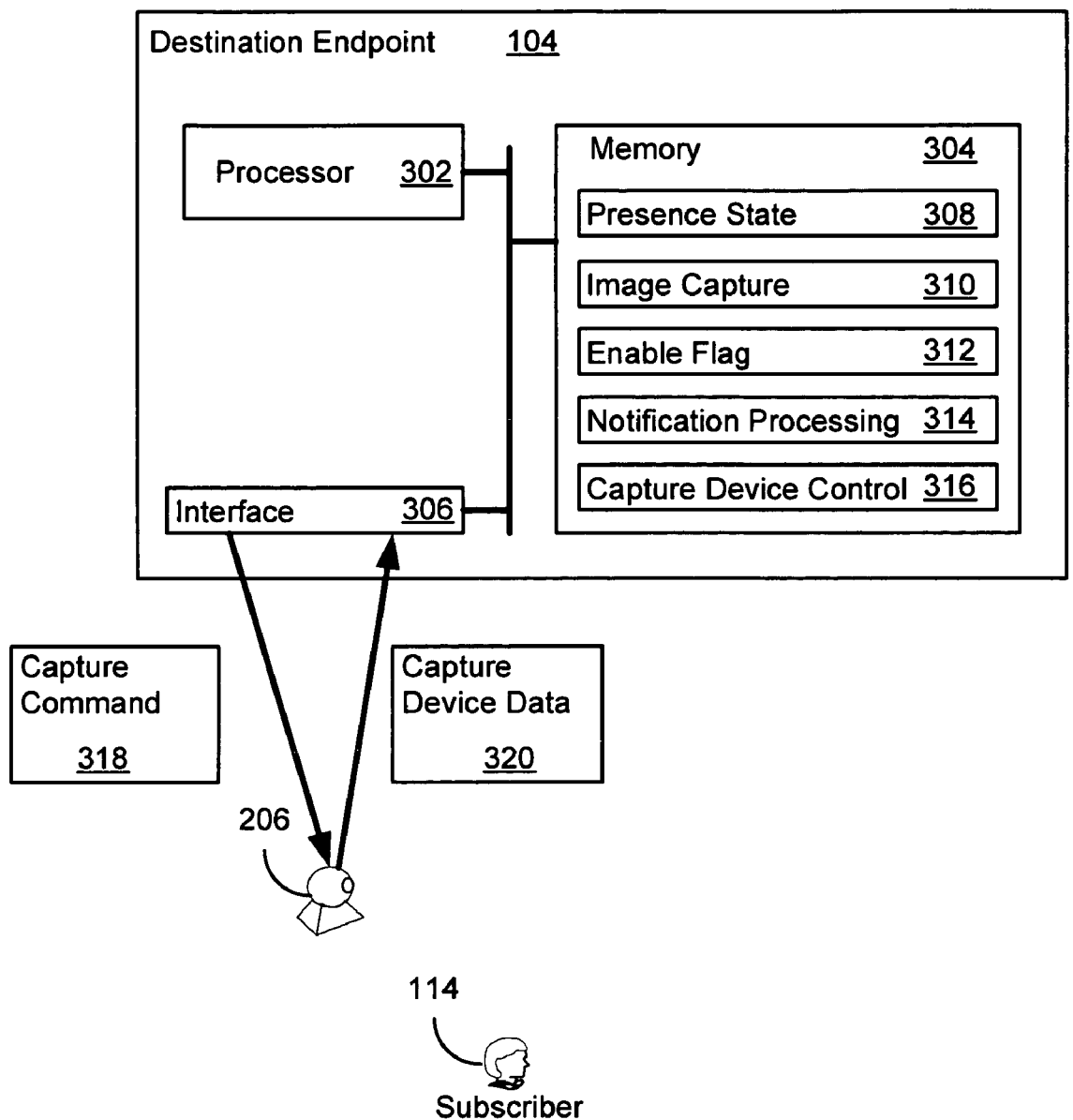
FIG. 3 illustrates a destination endpoint.

FIG. 3 shows one example of a destination endpoint 104 in a visualization enhanced presence system. The destination endpoint 104 includes a processor 302, a memory 304, and an interface 306. The interface communicates with the capture device 206.

The memory 304 stores presence state data 308, image capture data 310, and an image enable flag 312. The presence state data 308 may represent manually or automatically derived presence states obtained, for example, from the presence information system 110. For example, the presence state data 308 may indicate whether the individual 114 is unavailable, in a meeting, on vacation, or any other presence information. The image capture data 310 may be image files, video files, or any other type of visualization data.

The individual 114 may set or clear one or more image enable flags 312 to determine when the destination endpoint 104 is allowed to acquire image captures. An image enable flag 312 may apply to every request for image capture data. Alternatively, image enable flags 312 may be established for image capture data requests from specific individuals or groups of individuals, for certain times or dates, or may otherwise have specific application. Furthermore, image enable flags 312 may be provided on a global or individual basis for any of the image capture devices in communication with the destination endpoint 104.

The memory 304 also stores a notification processing program 314 and a capture device control program 316. The notification processing program 314 receives the notification 202 of the desired communication session and the media specifiers 204. When the originating endpoint 102 has requested pre-communication session visualization, the notification processing program 314 may check the enable flags 312 to determine whether image capture is authorized.

When image capture is requested and authorized, the capture device control program 316 issues a capture command 318 to the capture device 206. The capture command 318 may direct the capture device 206 to obtain one or more images, obtain a video, start video streaming, or take any other visualization action. The capture device 206 thereby obtains a visualization of the surroundings of the destination endpoint 104. The capture device 206 returns capture device data 320 to the destination endpoint 104. The capture device data 320 may be raw compressed or uncompressed image data or video frames, or may be pre-processed images or video data in any format (e.g., an industry standard .jpg file), or any other type of image data.

Figure 4:
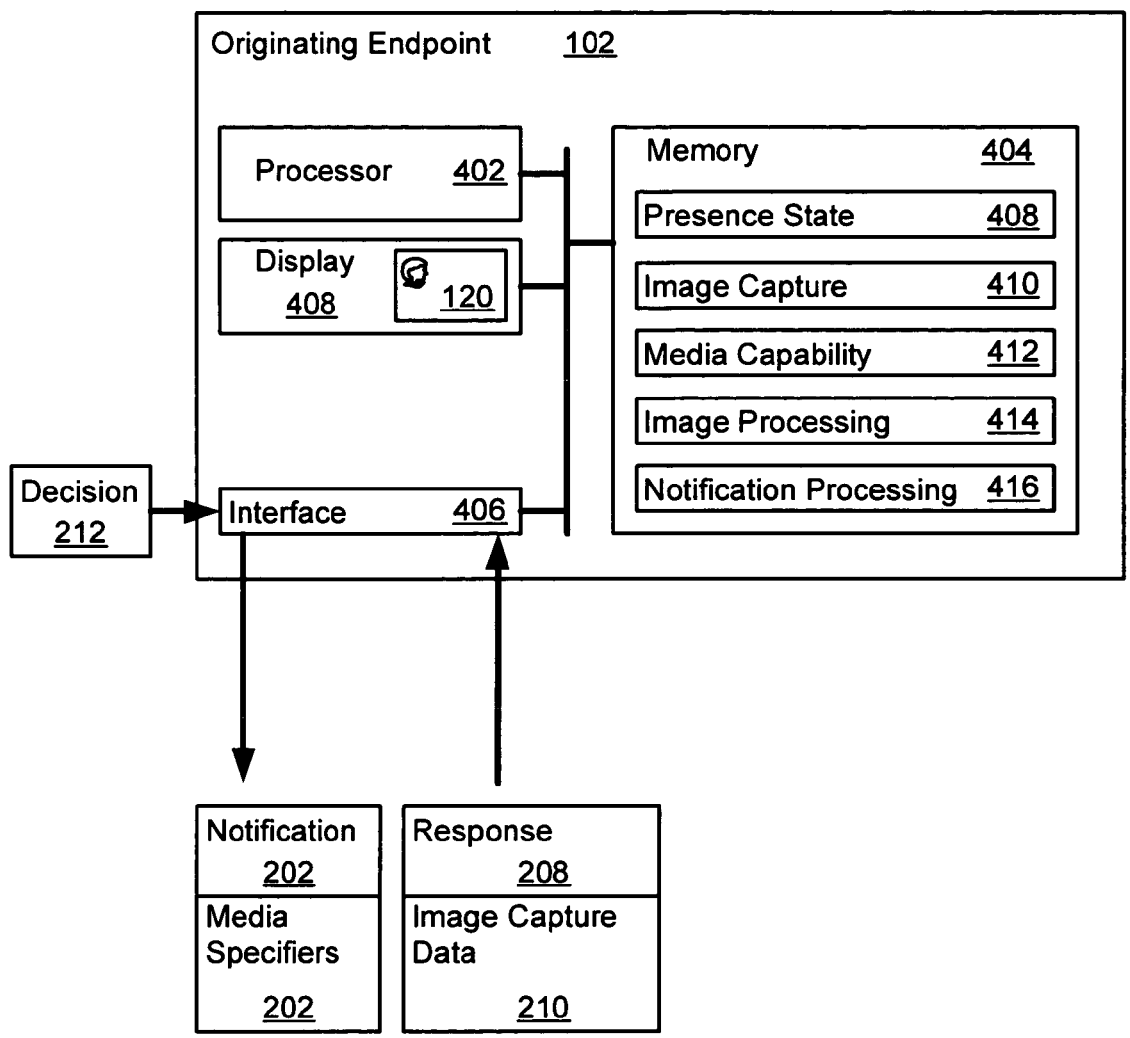
FIG. 4 illustrates an originating endpoint.

FIG. 4 shows one example of an originating endpoint 102 in a visualization enhanced presence system. The originating endpoint 102 includes a processor 402, a memory 404, an interface 406, and a display 408. The interface 406 communicates with the networks 106 to send notification messages 202 and receive image captures 210. The interface 406 may also receive the decisions 212 to continue and/or terminate call attempts. To that end, the interface 406 may include operator mouse and keyboard interfaces as well as network interfaces.

The memory 404 includes presence state data 408, image capture data 410, and media capability flags 412. The presence state data 408 may represent manually or automatically derived presence states as described above. The originating endpoint 102 receives the present state data 408 for the destination endpoint 104 directly from the destination endpoint 104, the presence information system 110, or another presence provider. The image capture data 410 may be image files, video files, or any other type of visualization data received from the destination endpoint 104, the presence information system 110, or another presence provider.

The media capability flags 412 may be set or cleared to indicate what types of visualizations the originating endpoint 102 is capable of processing and/or displaying. As examples, the media capability flags 412 may specify image, video, video streaming, certain types, formats, encoding, or protocols for images, video, or video streaming, or other media types. The media capability flags 412 may also specify from which destination endpoints the originating endpoint 102 will request image capture data.

The memory 404 also includes an image processing program 414 and a notification processing program 416. The notification processing program 416 prepares and communicates the notification message 202. The notification processing program 416 may execute in response to a user requesting that a communication session be established between the endpoints 102 and 104. The notification processing program 416 also may read the media capability flags 412, prepare and communicate the media specifiers 204, and receive the response 208 and/or image capture data 210.

The image processing program 414 renders the image capture data as an image capture display. To that end, the image processing program 414 may read the image capture data 410, interpret the image capture data 410, and provide the image capture display 120 to the display 408. The image processing program 414 may be a picture viewer, media player, or any other type of program which renders images on the display 408.

Figure 5:
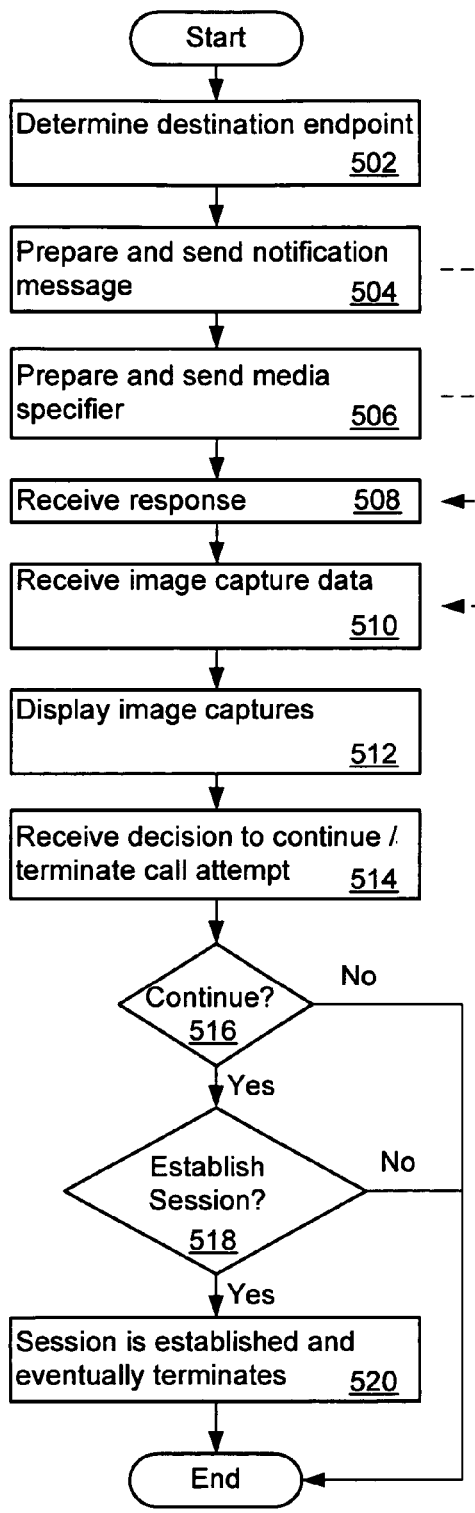
FIG. 5 illustrates acts that may be taken by an originating endpoint.

FIG. 5 provides a flow diagram 500 that summarizes the acts that may be taken by the originating endpoint 102 and the programs operating in the originating endpoint 102. At any time, the originating endpoint 102 determines that it will attempt to establish a communication session for a phone call, instant messaging sessions, or any other type of communication session. The originating endpoint 102 determines the destination endpoint for the communication session (Act 502). To that end, the originating endpoint 102 may consult a table of endpoint names or other identifiers, choose a contact from a contact or telephone number list, or otherwise identify the destination endpoint 104.

The originating endpoint 102 may then prepare and send the notification message 202 (Act 504) and the media specifier 204 (Act 506). The originating endpoint 102 receives a response 208 (Act 508), such as an indication that a callee's phone is 'ringing'. If requested and the destination endpoint 104 has authorized it, the originating endpoint 102 may receive image capture data 210 from the destination endpoint 104 (Act 510).

The image capture data may represent the surroundings or environment of the destination endpoint 104. Pictures, movies, streaming video, or other types of visualization may capture the surroundings. The display 408 associated with the endpoint 102 shows the visualization (Act 512). The operator of the endpoint 102 may then refer to the visualization as a supplement to other presence information for the endpoint 104, or as an independent statement of presence for the endpoint 104.

The operator of the endpoint 102 may issue a decision 212 of whether to continue the call attempt or terminate the call attempt. The endpoint 102 receives the decision (Act 514) through a keyboard, mouse, voice command, or other input mechanism. Alternatively or additionally, the endpoint 102 may perform automated or semi-automated image processing on the image capture data to determine the presence or absence of image features relevant to presence. For example, the endpoint 102 may apply an image processing algorithm to locate, identify, or determine the presence of a person, shape, or environmental condition. The endpoint 102 may then provide its own decision of whether to continue the call attempt, depending on the presence or absence of the person, shape, or environmental condition present in the image.

The endpoint evaluates the decision 212 (Act 516). When the decision 212 is to terminate, the endpoint 102 ends the call attempt. Otherwise, the endpoint 102 continues the call attempt and may establish the communication session (Act 518). Any established communication session eventually terminates (Act 520).

Figure 6:
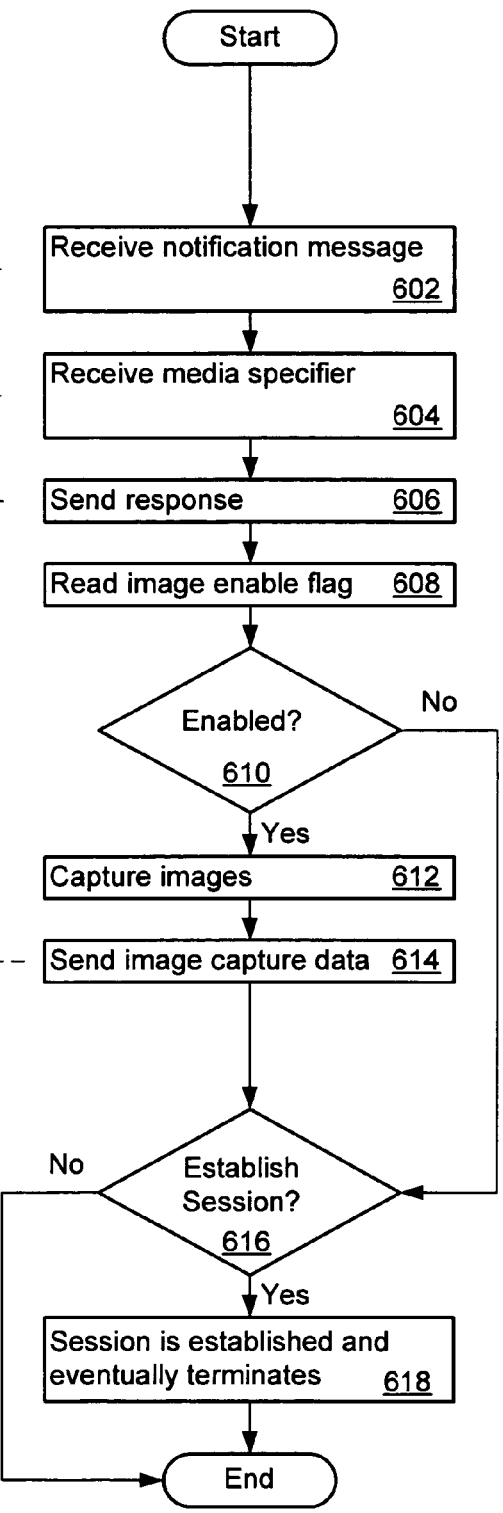
FIG. 6 illustrates acts that may be taken by a destination endpoint.

FIG. 6 provides a flow diagram 600 which summarizes the acts that may be taken by the destination endpoint 104 and the programs operating in the originating endpoint 104. The destination endpoint 104 receives a notification message (202) from an entity in the network 100 (Act 602) and also receives a media specifier (204) (Act 604). The destination endpoint 104 sends a response (208) to the notification (Act 606). The response may include a flag, field, or other data which indicates whether the destination endpoint 104 has the capability to capture image data or make any other response requested by the originating endpoint 102.

The media specifier (204) may indicate that the originating endpoint 102 has asked for image capture. Before filling that request, the destination endpoint 104 may read the image enable flags 312 (Act 608) and may determine whether the originating endpoint 102 is authorized to receive image captures (Act 610). When authorized, the destination endpoint 102 captures image data (Act 612) and communicates the image capture data 210 to the originating endpoint 102 or other entity in the network 100 (Act 614).

The destination endpoint 104 may or may not be capable or authorized to provide the image capture data 210. Regardless, the destination endpoint 104 may establish the communication session (Act 616). The established communication session eventually terminates (Act 618).

The origination endpoint 102 and destination endpoint 104 support visualization of presence. Before establishing a communication session 122, the destination endpoint 104 captures a picture or video and provides the picture or video to the originating endpoint. The visualization shows the surroundings of the destination endpoint. The visualized presence provides an independent indication of presence status associated with the destination endpoint.

The visualization may show the operator of the originating endpoint 102 that no one is present to respond to the instant message. Rather than allowing an instant messaging system to repeatedly prompt for an answer, the originating endpoint 102 may then terminate the attempt to establish the instant messaging session. The originating endpoint 102 thereby saves network bandwidth and processing resources devoted to what will be an unsuccessful attempt.

The destination endpoint 104 may be an automated (e.g., a parking garage camera) or non-automated (e.g., a personal cell phone) endpoint. Accordingly, the image capture data may provide a view of an office, conference room, parking garage or other space. Automated endpoints may be established at service providers, such as cable television providers. The cable television endpoints may return image capture data representative of movies available for pay-per-view, movies currently playing on one or more television channels, services available from the cable television provider, or image capture data for any other purpose.

It is therefore intended that the foregoing detailed description be regarded as illustrative rather than limiting, and that it be understood that it is the following claims, including all equivalents, that are intended to define the spirit and scope of this invention.

The invention claimed is:

1. A presence communication method comprising:
   a first endpoint determining a second endpoint with which to establish a desired communication session;
   the first endpoint sending a Session Initiation Protocol (SIP) notification message to the second endpoint regarding the desired communication session;
   the second endpoint providing a response message to the SIP notification message prior to establishing the desired communication session, the response message containing presence state data, and image capture data comprising surroundings of the second endpoint, the image capture data provided by an image device in communication with the second endpoint;
   the first endpoint receiving the response message from the second endpoint prior to establishing the desired communication session;
   the first endpoint making a decision based on the image capture data and presence state data, prior to establishing the desired communication session, of whether to terminate an attempt to establish the desired communication session or to continue to establish the desired communication session; and
   wherein making the decision comprises the first endpoint performing image processing on the image capture data and interpreting the presence state data to determine a presence of the second endpoint; and
   wherein the second endpoint providing a response message to the SIP notification message comprises the second endpoint checking an image enable flag, the second endpoint providing image capture data when the image enable flag is set, and the second endpoint not providing the image capture data when the image enable flag is clear such that the response message does not contain the image capture data.

2. The method of claim 1 wherein the image capture data comprises a picture image of surroundings of the second endpoint.

3. The method of claim 1 wherein the image capture data comprises a video of surroundings of the second endpoint.

4. The method of claim 1 wherein the notification message comprises an SIP 'invite' initiation message.

5. The method of claim 4 wherein the notification message further comprises a media specifier, the media specifier comprising at least one of a media capability indicator that identifies media handling capabilities of the first endpoint and a request for the image capture data.

6. The method of claim 1 wherein the presence state data is a presence state of a user of the second endpoint.

7. The method of claim 1 wherein the second endpoint comprises an automated endpoint and wherein the image capture data comprises an image of surroundings of the second endpoint.

8. A communication system comprising:
   a first endpoint having a processor and a memory, the processor coupled to the memory, the memory comprising:
     a notification processing program communicating at least one notification message regarding a desired communication session, the desired communication session being a call,
     an image processing program; and
   a second endpoint having a processor and a memory, the processor coupled to the memory, the memory comprising:
     an image capture device control program,
     presence state data of the second endpoint,
     a notification processing program receiving the at least one notification message regarding the desired communication session; and
   an image capture device capturing image data; and
   wherein the processor of the first endpoint executes the notification processing program and the image processing program of the first endpoint; and
   wherein the processor of the second endpoint executes the capture device control program and the notification processing program of the second endpoint; and
   wherein the capture device control program issues a capture command to the image capture device upon receipt of the notification message by the second endpoint; and
   wherein the image capture device provides captured image data to the second endpoint; and
   wherein the second endpoint sends the captured image data and the presence state data to the first endpoint in response to the at least one notification message sent by the first endpoint; and
   wherein the first endpoint makes a decision based on the captured image data and the presence state data prior to establishing the desired communication session whether to terminate an attempt to establish the desired communication or to continue to establish the desired communication session; and
   wherein the first endpoint makes the decision by performing image processing on the captured image data and interpreting the presence state data to determine a presence of the second endpoint; and
   wherein the memory of the second endpoint further comprises an image enable flag, and wherein the capture device control program causes the captured image data to be obtained when the image enable flag is set and the capture device control program forgoes causing the captured image data to be obtained when the image enable flag is clear such that no captured image data is sent to the first endpoint in response to the at least one notification message.

9. The presence enabled communication system of claim 8, wherein the captured image data comprises a visualization of surroundings of second endpoint.

10. The presence enabled communication system of claim 9, wherein the captured image data comprises a video of surroundings of the second endpoint.

11. The presence enabled communication system of claim 9, wherein the captured image data comprises a picture of surroundings of the second endpoint.

12. The presence enabled communication system of claim 9, wherein the presence state data is a presence state of a user of the second endpoint.

13. The presence enabled communication system of claim 8 wherein the second endpoint comprises an automated endpoint and wherein the captured image data comprises an image of surroundings of the second endpoint.

14. A method for communicating presence data comprising:
  a first endpoint sending a notification message to a second endpoint prior to data transmission between the second endpoint and the first endpoint and prior to initiating a communication session between the first endpoint and the second endpoint, the communication session being a call, the call requiring voice data to be transmitted between the first endpoint and the second endpoint;
  after receiving the notification message, the second endpoint communicating with an image capture device to capture image data for a surrounding of the second endpoint;
  the second endpoint sending a response message to the first endpoint, the response message comprising the captured image data of the second endpoint; and
  the user of the first endpoint deciding whether to continue attempting to establish the communication session with the second endpoint based on an evaluation of the response message; and
  wherein the second endpoint communicating with the image capture device to capture image data comprises the second endpoint checking an image enable indicator to determine if the captured image data is authorized to be obtained; and
  if the capture image data is not authorized to be obtained, not capturing the image data such that the response message does not have the captured image data; and
  if the captured image data is authorized to be obtained, the second endpoint communicating the captured image data to the first endpoint via the response message.

15. The method of claim 14 wherein the notification message comprises a media specifier, and wherein the media specifier indicating media handling capabilities of the first endpoint and having a media request requesting the captured image data.

16. The method of claim 14 wherein the first endpoint sends a media specifier to the second endpoint to request the captured image data.

17. The method of claim 16 wherein the notification message comprises an SIP invite message.

18. The method of claim 14 wherein the second endpoint comprises an automated endpoint and the captured image data comprises an image of surroundings of the second endpoint.

19. The method of claim 14 wherein presence state data is also provided in the response message, the presence state data indicating a presence state of a user of the second endpoint.

* * * * *